United States Patent [19]

Mukuda et al.

[11] 4,347,421
[45] Aug. 31, 1982

[54] AUTOMATIC PIPE CIRCUMFERENCE WELDING APPARATUS

[75] Inventors: Mutsuo Mukuda; Masahiro Murakami; Kazuo Aotsuka, all of Amagasaki, Japan

[73] Assignee: Sumitomo Precision Products Company Limited, Amagasaki, Japan

[21] Appl. No.: 233,576

[22] Filed: Feb. 11, 1981

[30] Foreign Application Priority Data

Feb. 15, 1980 [JP] Japan ............................ 55-18679[U]
Feb. 29, 1980 [JP] Japan ............................ 55-26589[U]

[51] Int. Cl.³ ............................................ B23K 9/225
[52] U.S. Cl. ............................ 219/60 A; 219/125.11; 228/29
[58] Field of Search ................... 219/60 A, 125.11; 228/29

[56] References Cited

U.S. PATENT DOCUMENTS 3,268,707 8/1966 Thomas .......................... 219/60 A
3,910,480 10/1975 Thatchor ........................ 219/60 A Primary Examiner—Elliot A. Goldberg
Attorney, Agent, or Firm—Watson, Cole, Grindle & Watson

[57] ABSTRACT

Herein disclosed is an automatic welding apparatus which comprises an arcuate frame including a welding unit and a pair of wire feeders, and an arcuate frame including a running truck and a pair of clamping mechanisms for fastening the outer circumference of a pipe to be welded. The aforementioned two arcuate frames are detachably connected at two positions thereby to form a ring shape. Thus, the pipe is automatically welded while the truck is being made to run in the circumferential direction. The running truck of the welding apparatus thus constructed carries both a mechanism for effecting close contact with the outer circumference of the pipe and a shock absorbing mechanism so that the distance between the leading end of a welding torch and the outer circumference of the pipe may be constant at all times.

8 Claims, 12 Drawing Figures

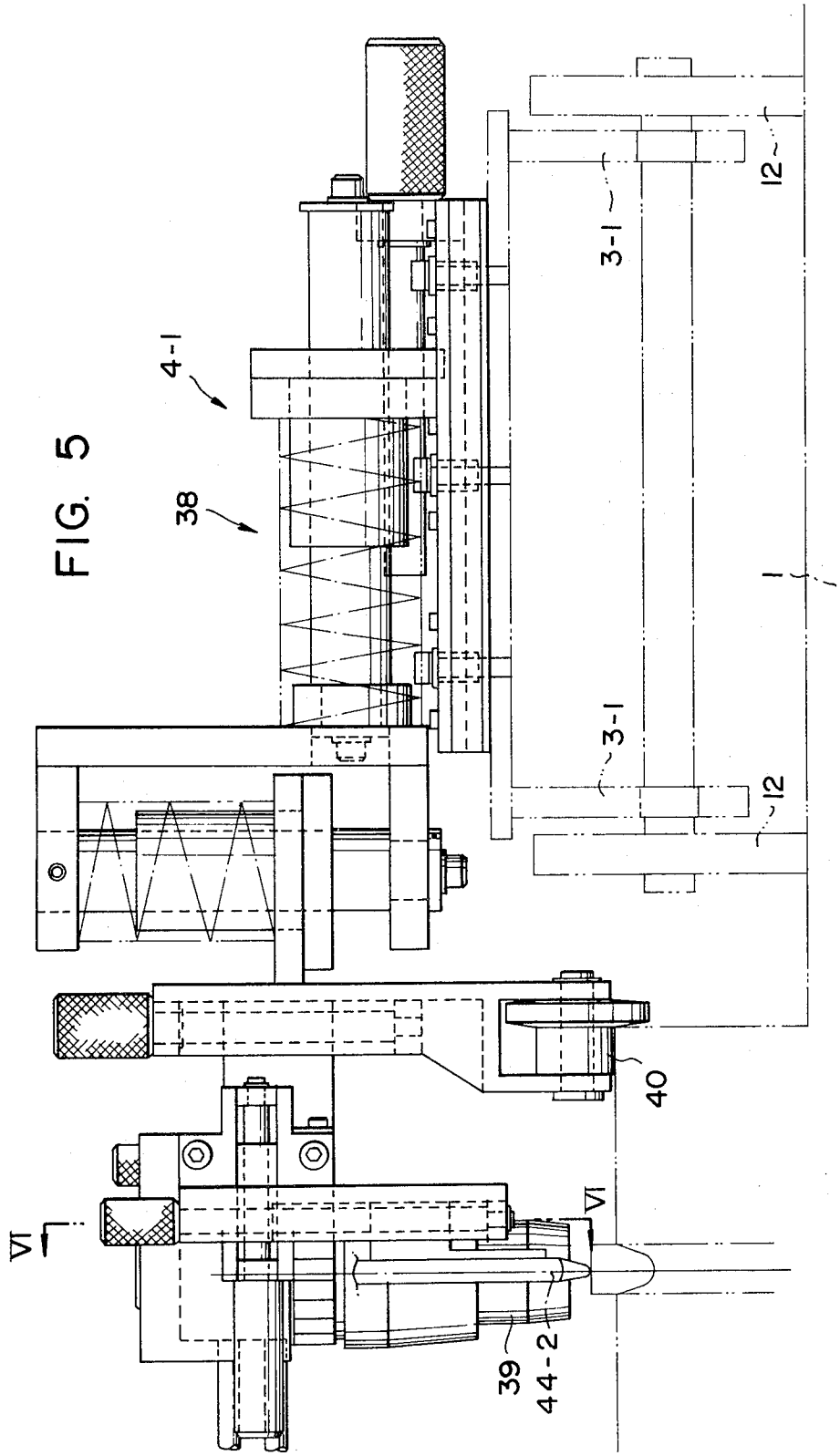

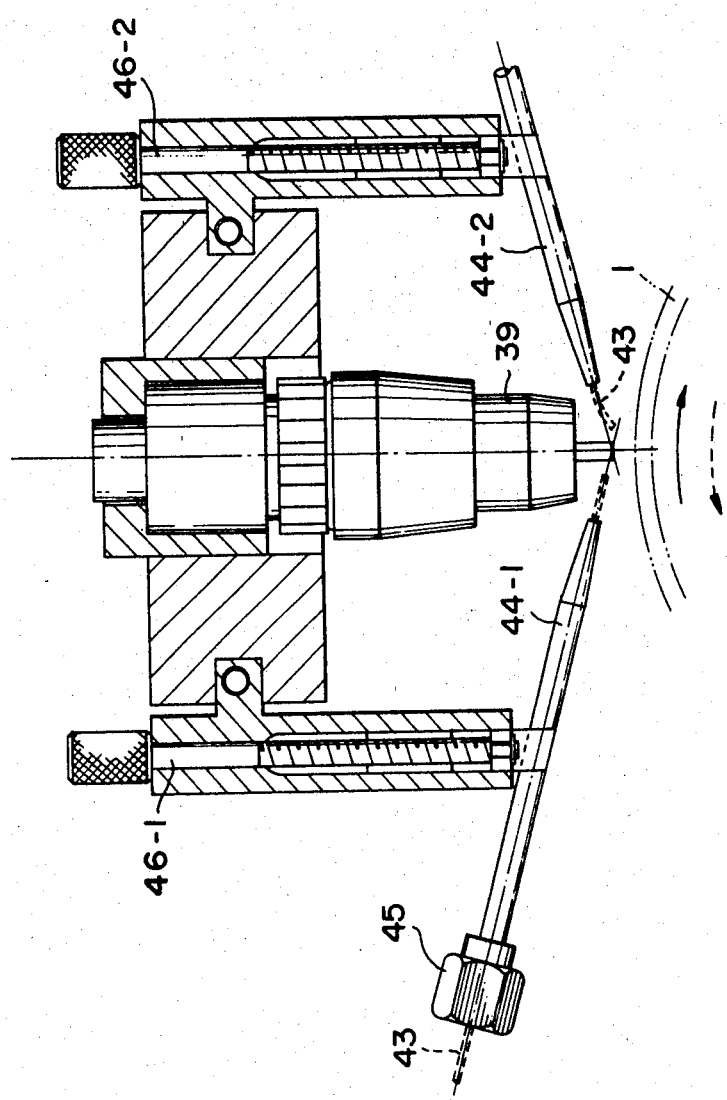

AUTOMATIC PIPE CIRCUMFERENCE WELDING APPARATUS

BACKGROUND OF THE INVENTION

1. Field of the Invention

The present invention relates to an apparatus for automatically welding the circumferences of pipes which are laid in horizontal positions so that they may be jointed.

2. Description of the Prior Art

As the welding apparatus of the above kind, there has been known in the art a tungstem inert-gas arc welding apparatus which is usually abbreviated to "TIG wedling apparatus". This TIG welding apparatus is constructed, for example, of two arcuate frames, which are detachably connected at their two portions thereby to form a ring shape, and a welding torch, a wire feeder, a running truck, and clamping mechanisms, all of which are integrally attached to those arcuate frames. The clamping mechanisms are used to clamp the outer circumferences of the pipes. On the other hand, the running truck, and the welding torch and the wire feeder are mounted on the different arcuate frames so that they can be separated. With this construction, the welding operation is performed while the aforementioned running truck is being made to run in the circumferential direction.

However, the conventional apparatus thus constructed is not equipped with a shock absorbing mechanism for absorbing the vertical vibrations resulting from the roughnesses on the outer circumferences of the pipes and has a defect that the spacing between the leading end of the welding torch and the pipes cannot be maintained constant. Moreover, in case the body of the apparatus constructed of those two arcuate frames is to be attached to the outer circumferences of the pipes, the clamping mechanisms of the conventional apparatus are of manual type so that they cannot enjoy an excellent working property and have a defect that they cannot be mounted in desired positions with ease.

Still moreover, the aforementioned running truck carries the welding torch, the wire feeder, a profiling unit and so on, but is so constructed as to perform the welding operation in one direction while being fed with only one wedling wire. As a result, if multi-layered welding operations of several times are performed in one direction, the torch, driving power supply cables, a cooling water hose, an inert gas hose and so on will wind themselves round the pipes. In addition, the automatic welding operation is characterized to have a tendency that the bed width becomes small and the penetration becomes deep when the welding torch ascends whereas the bead width becomes large and the penetration becomes shallow when the torch descends. As a result, in the multi-layered welding operations, the differences between the ascent and descent are accumulated and enlarged so that the welding conditions have to be highly precisely controlled in order to perform the satisfactory welding operations. In order to obviate the aforementioned tendency, therefore, it is necessary either to restore the starting point, after the welding operation of one turn, thereby to restart the welding operation of another turn or to move a wire fed guide to the opposite side after the welding operation of the one turn. In either event, there arises another defect that much labor is required to deteriorate the working property.

SUMMARY OF THE INVENTION

It is therefore an object of the present invention to provide an automatic pipe circumference weling apparatus which can maintain the spacing between the leading end of a welding torch and the outer circumference of a pipe at a predetermined constant level.

Another object of the present invention is to provide an automatic pipe circumference welding apparatus which can be attached without any difficulty to a predetermined position on the outer circumference of the pipe.

Still another object of the present invention is to provide an automatic pipe circumference welding apparatus which can perform the multi-layered welding operations of excellent weldability in remarkably high efficiency.

The present invention is featured by the facts that the welding apparatus is equipped with a shock absorbing mechanism, that the clamping mechanisms are of electric type, and that two feeders for feeding two filler wires are disposed forward and backward of the advancing direction of the welding torch.

Further objects, advantages and features of the present invention will become more fully apparent from a detained consideration of the arrangement and construction of the constituent parts as set forth in the following specification taken together with the accompanying drawings.

BRIEF DESCRIPTION OF THE DRAWINGS

In the drawings:

FIG. 5 is a side elevation showing a welding unit to be used with the welding apparatus of the present invention;

FIG. 6 is a section taken along line VI—VI of FIG. 5;

DESCRIPTION OF THE PREFERRED EMBODIMENTS

Figure 1:
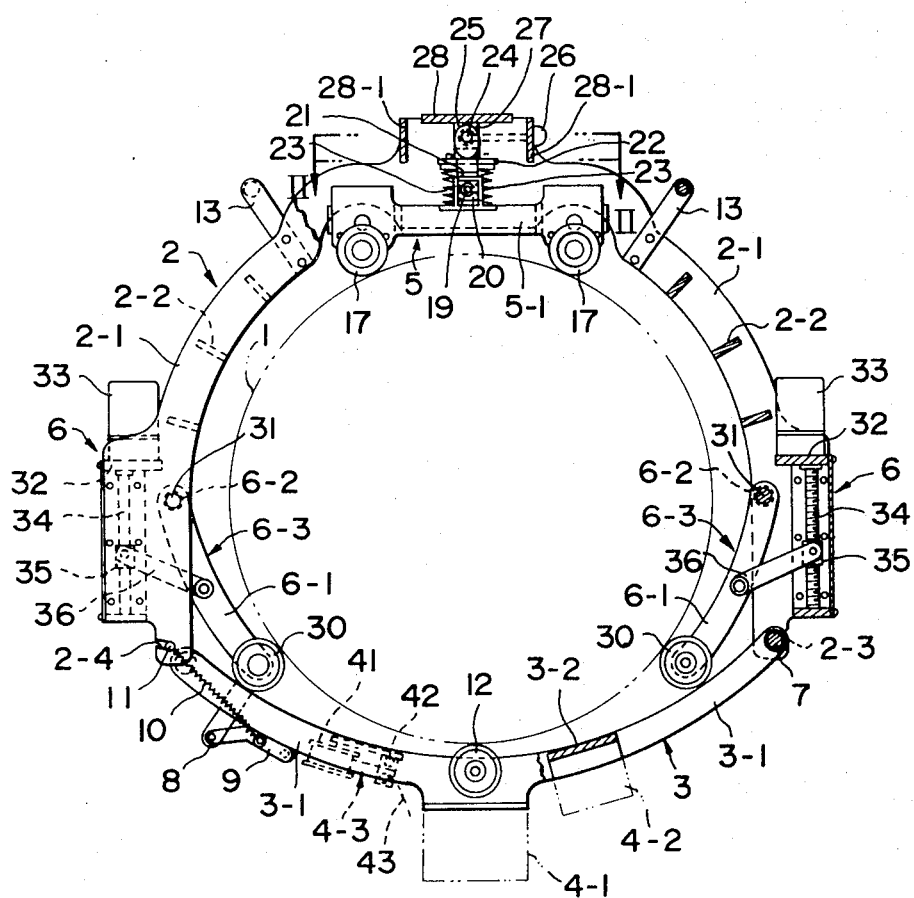
FIG. 1 is a partially broken-away front elevation showing one embodiment of a welding apparatus according to the present invention.
Figure 2:
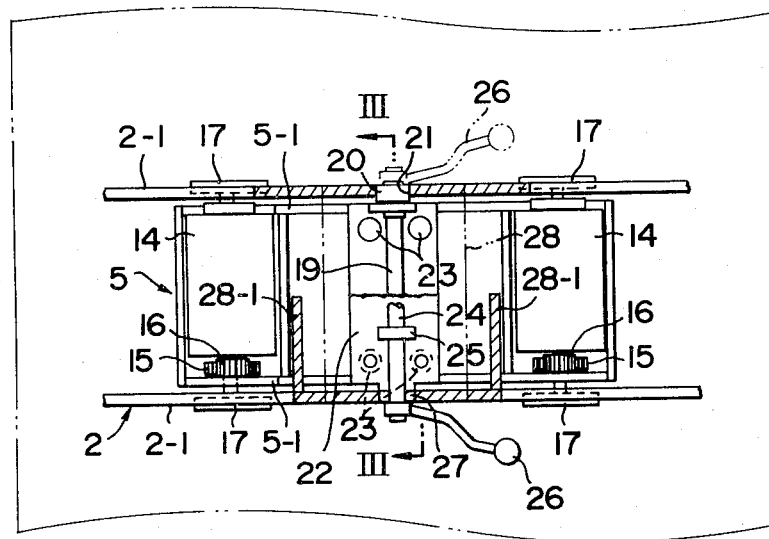
FIG. 2 is a section taken along line II—II of FIG. 1.
Figure 3:
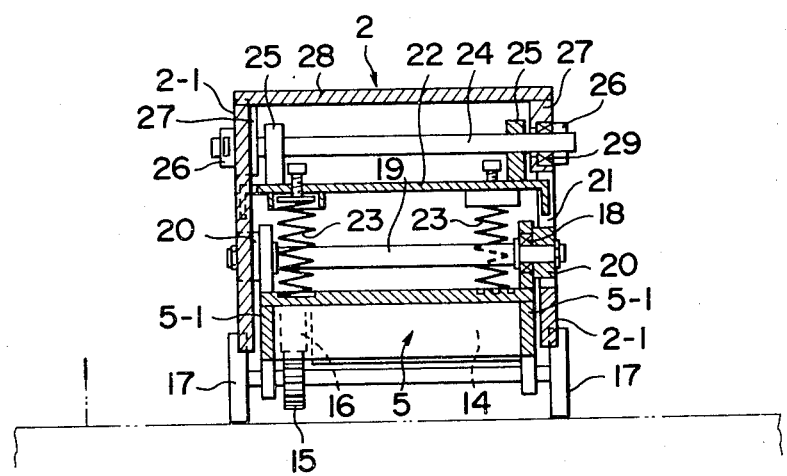
FIG. 3 is a section taken along line III—III of FIG. 2.
Figure 4:
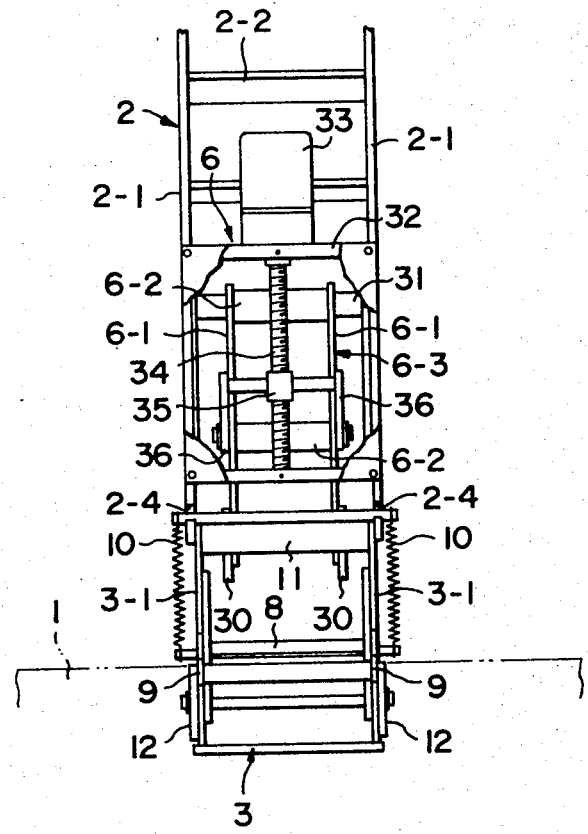
FIG. 4 is a side elevation showing a clamping mechanism to be used with the welding apparatus of the present invention.

An automatic pipe circumference welding apparatus according to the present invention will now be described with reference to the accompanying drawings. Reference numerals 1, and 2 and 3 generally indicate a pipe to be welded, and two arcuate frames which are detachably connected at their two portions thereby to form a ring shape. Numerals 4-1, 4-2 and 4-3 indicate a welding unit having a welding torch and so on and two welding wire feeders, respectively. Numerals 5 and 6 generally indicate a running truck and two clamping mechanisms for clamping the outer circumference of the pipe to be welded, respectively. First of all, more specifically, the two arcuate frames 2 and 3 have their respective paired frame members 2-1 and 3-1 arranged in parallel and constructed into unitary structures by means of a plurality of spacer ribs 2-2 and spacer plates 3-2, respectively. As connecting means of those two frame, the arcuate frame 2 at the side of the running truck 5 is formed at both its trailing ends with engagement recesses 2-3 and 2-4. There is removably fitted in one 2-3 of the aforementioned engagement recesses a connecting rod 7 which is attached in a horizontal position to one end of the arcuate frame at the side of the welding unit 4-1. In the other engagement recess 2-4, on the other hand, there is removably fitted a connecting rod 11 which is attached through two springs 10 to a setting handle 9 which in turn is pivotally connected to the other end of the aforementioned arcuate frame 3 in a manner to rotate about a pin 8. Thus, the two frames 2 and 3 can be connected by fitting the connecting rod 7, which is integrally attached to the arcuate frame 3 itself, in the engagement recess 2-3 at the same side, by then fitting the connecting rod 11 made integral with the springs 10 in the engagement recess 2-4 at the same side, and by falling the setting handle 9 toward the pipe 1. Incidentally, numerals 12 and 13 indicate guide rollers and handles, respectively.

Next, the running truck 5 is mounted on the center portion of the arcuate frame 2 and is constructed such that its body 5-1 can be fitted between the front and rear frame members 2-1 of the arcuate frame 2 and carries drive motors 14, by which front and rear wheels 17 are independently driven through gears 15 and 16. At the center portion above the upper surface of the truck body 5-1, a single shaft 19 is rotatably supported by two bearings 18 which are disposed at the both sides, and two guides 20 attached to both the ends of that shaft 19 are slidably fitted in grooves 21, which are formed in the diametrical direction of the pipe 1 at both the sides of the arcuate frame 2, so that the truck body 5-1 is made integral with the arcuate frame 2. As a result, the truck body 5-1 can partly slide in the direction of its height within the grooves 21 through the guides 20 and partly rotate about the shaft 19. The fixture of the truck body 5-1 thus constructed is performed by interposing shock absorbing means such as four springs 23 between the upper surface of the truck and a horizontal plate 22, which is disposed in a horizontal position above the aforementioned shaft 19 while having both its end portions vertically movably fitted in the aforementioned grooves 21 of the arcuate frame 2, by receiving the upper surface of the aforementioned horizontal plate 22 upon two cams 25, which are fixed to the vicinities of the two ends of a shaft 24 rotatably disposed in a horizontal position above the arcuate frame 2, and by rotating the cams 25 by means of handles 26, which are fixed to the ends of said cam shaft 24, so that the horizontal plate 22 is pushed to force the wheels 17 of the truck body 5-1 into close contact with the outer circumference of the pipe 1. The aforementioned cam shaft 24 is equipped at both its ends with two bearings 27, which are fitted in the grooves 21 of the arcuate frame 2, and is rotatably laid through bearings 29 upon an upper plate 28 which is fixed to the heads of the frame members 2-1 by means of bolts or the like. Here, the cams 25 are so shaped and positioned that the shock absorbing springs are compressed, if the handles 26 are fallen, e.g., to the right, as viewed in FIG. 1, and loosened if the handles 26 are fallen to the left. Incidentally, numeral 28-1 indicates spacer bars.

Now, each of the clamping mechanisms 6 for clamping the outer circumference of the pipe 1 to be welded is constructed such that clamp arms 6-3, in which a pair of parallel arcuate plates 6-1 are integrated with spacer pipes 6-2, have their leading ends pivotally carrying such guide rollers 30 as can turn on the pipe to be welded and have their other ends pivotally connected to both the ends of the frame members 2-1 by means of a pivot pin 31, such that a threaded rod 34 is directly connected to the drive shaft of a motor 33 which is mounted on a frame 32 attached to the frame members 2-1 of the arcuate frame 2, and such that the clamp arms 6-3 are connected to a nut 35, which is screwed on the threaded rod 34, through links 36 in a manner that the clamp arms 6-3 are rocked about the pivot pin 31 to approach and leave the pipe 1 to be welded in accordance with the forward and backward movements of that nut 35. In short, both the clamp arms 6-3 are so adjusted that they are opened, when the nut 35 is turned toward the motor 33, and closed to clamp the pipe 1 when the nut 35 is moved apart from the motor 33. Incidentally, the control of the motor 33 is performed by means of a push-button switch 37 which is attached to the arcuate frame 2.

Figure 7A:
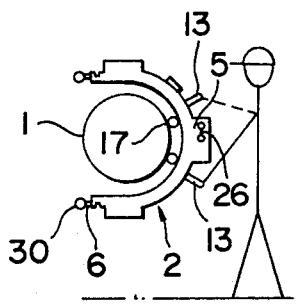
FIGS. 7A to 7D are schematic views illustrating a series of procedures of attaching the welding apparatus of the present invention to a pipe to be welded.
Figure 7C:
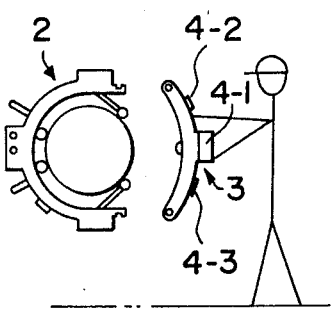
Figure 7B:
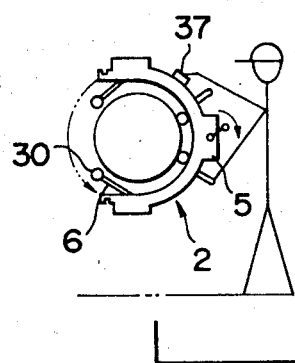
Figure 7D:
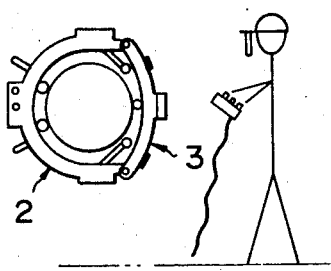

The case, in which the automatic welding apparatus having the construction thus far described is mounted on the pipe 1 to be welded, will not be described with reference to FIGS. 7A to 7D. First of all, the arcuate frame 2 at the side of the running truck 5 is lifted by gripping the handles 13 and is shifted to a position sideway of the pipe 1, as shown in FIG. 7A. Under this condition, the push-button switch 37 of the clamping mechanism 6 is operated to clamp the pipe 1, as shown in FIG. 7B. At the same time, the handles 26 for fixing the running truck 5 is fallen in a predetermined direction thereby to compress the shock absorbing springs 23. Then, the running truck 5 is made to run by 180 degrees until the arcuate frame 2 is moved to the back of the pipe so that both the end portions of the frame 2 are positioned to face the side of an operator. After that, the other arcuate frame 3 at the side of the welding unit 4-1 is connected to the partner frame 2, as shown in FIG. 7C. After that, the welding operation is started, as shown in FIG. 7D. The mounting operation according to the prior art usually requires one or two workers. According to the present invention, however, since the clamping mechanisms 6 are of electric type, the frame at the side of the running truck can be automatically fixed at such a position that the other frame can be mounted with ease. As a result, the present invention can enjoy an excellent working property.

In case the welding apparatus is to be removed from the pipe, on the other hand, it is fixed at such a position as can be easily disengaged, and the frame at the side of the welding unit is first removed. Then, the running truck 5 is moved to the side of the operator, and the handles 26 are fallen to the opposite side thereby to weaking the compression of the shock absorbing springs. After that, the push-button switch is operated to open the clamp arms 6-3 so that the frame 2 at the side of the running truck is taken out. The removing operation thus far described can be easily and promptly performed similarly to the aforementioned mounting operation.

Figure 8A:
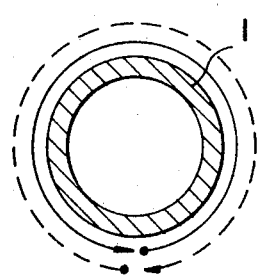
FIGS. 8A and 8B are schematic views illustrating a multi-layered welding method.
Figure 8B:
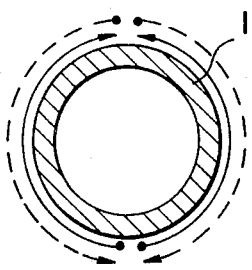

In case it is intended to perform the multi-layered welding operation, on the other hand, the half-turn welding step is accomplished, as shown in a solid arrow in FIG. 8A, and the welding direction is subsequently reversed, as shown in a broken arrow. In an lanternative, as shown in FIG. 8B, after the one-turn welding step (as shown in a solid arrow), the welding direction is likewise reversed (as shown in a broken arrow).

Now, the welding unit 4-1 and the wire feeders 4-2 and 4-3 will be described in detail with reference to FIGS. 5 and 6.

The welding unit 4-1 is constructed of a profiling unit 38, a welding torch 39, and rollers 40 for supporting the former components, all of which are well known in the art. At the both sides of and at a predetermined spacing from the welding unit thus constructed, there are arranged the wire feeders 4-2 and 4-3, each of which is constructed of a wire reel 41 and a wire delivery roll 42, as shown in FIG. 1.

The wires 43, which are let off from their feeders 4-2 and 4-3, are fed to the wire inlets 45 of wire feed guides 44-1 and 44-2, which are arranged to have their leading outlets facing forward and backward of the advancing direction of the welding torch 39, as shown in FIG. 6. In order that the wire feed guides 44-1 and 44-2 may have their tip heights made adjustable, holders 46-1 and 46-2 for holding the wire feed guides are made vertically movable.

In case the multi-layered welding operation is to be performed with the use of the welding unit 4-1 thus far described, the wire feeders are interchanged so that the wire 43 positioned in front of the welding torch 39 may be fed. More specifically, in case the welding torch 39 is advancing in the direction of the solid arrow in FIG. 6, the wire 43 is fed by the wire feed guide 44-2. On the contrary, in case the the welding torch 39 is advancing in the direction of the broken arrow, the wire 43 is fed by the wire feed guide 44-1.

As has been described hereinbefore, according to the present invention, since the running truck 5 is so constructed that it can rotate about the shaft 19 and move in the direction of the height through the shock absorbing springs 23, all the vibrations due to the roughnesses on the pipe to be welded can be absorbed, and the spacing between the leading end of the welding torch and the pipe can always be maintained constant.

According to the present invention, moreover, since the shock absorbing mechanism is built in the truck mounting portion and since the clamping mechanisms are of the electric type, the circumference of the pipe can be welded satisfactorily and stably, and the welding apparatus itself can be easily and promptly detached so that the working efficiency can be remarkably improved. As another advantage, the multilayered welding operation of excellent wedability and high reliability can be performed in a remarkably high efficiency.

While the present invention has been described with reference to particular embodiments thereof, it will be understood that numerous modifications may be made by those skilled in the art without actually departing from the spirit and scope of the present invention as defined in the appended claims.

We claim:

1. An automatic pipe circumference welding apparatus comprising: a first arcuate frame including a welding unit and wire feeding means; and a second arcuate frame detachably attached to both the ends of the first-named arcuate frame and including clamp means and guide rollers substantially at both the ends thereof and a running truck having drive wheels substantially at the center thereof, said running truck further having a shaft rotatably laid at the center above the upper surface of the truck body and made slidable in the direction of the height of said running truck, a horizontal plate disposed above said shaft and made slidable in said direction, shock absorbing means interposed between the upper surface of said body and said horizontal plate, and means for pushing said horizontal plate thereby to bring said drive wheels through said shock absorbing means into close contact with a pipe to be welded.

2. An apparatus according to claim 1, wherein said clamp means each has a clamp arm having its one end pivotally connected to the second-named arcuate frame, a threaded rod adapted to be rotated by a motor, and a link having its one end pivotally connected to said clamp arm and its other end carrying a nut which is screwed on said threaded rod, and wherein said clamp arm has its other end carrying the corresponding one of said guide rollers.

3. An apparatus according to claim 1 or 2, wherein said welding unit has a welding torch and two wire feed guide means having their leading ends facing forward and backward of the advancing direction of said welding torch, and wherein the wires supplied are fed to the wire inlets of said wire feed guide means.

4. An apparatus according to claim 1, wherein said shock absorbing means has a pair of shock absorbing springs.

5. An apparatus according to claim 1, wherein said shaft has both its ends fitted in the grooves, which are formed in the side walls of the second-named arcuate frame, so that it is made slidable in the direction of the height of said running truck.

6. An apparatus according to claim 1, wherein said horizontal plate has both its ends fitted in the grooves, which are formed in the side walls of the second-named arcuate frame, so that it is made slidable in the direction of the ehight of said running truck.

7. An apparatus according to claim 1, wherein the means for bringing said drive wheels into close contact with the pipe has a shaft rotatably laid in the second-named arcuate frame, a pair of cams mounted on said shaft in the vicinity of both the ends thereof and abutting against the upper surface of said horizontal plate, and a pair of handles fixed to both the ends of said shaft.

8. An apparatus according to claim 1, wherein said wire feeding means each has a wire reel and a wire delivery roll.

* * * * *